Patented Nov. 21, 1933

1,935,725

UNITED STATES PATENT OFFICE 1,935,725

PROCESS FOR DESULPHURIZING PETROLEUM DISTILLATES

John Perl, Los Angeles, and Reinhardt Schuhmann, Long Beach, Calif., assignors to Union Oil Company of California, Los Angeles, Calif., a corporation of California No Drawing. Application August 10, 1929
Serial No. 385,080

2 Claims. (Cl. 196—32)

This invention refers to a process for treating petroleum distillates, particularly gasolines, containing corrosive sulphur bodies.

It is well known that gasolines contain several types of sulphur bodies. One of these types imparts corrosive properties to gasoline, of which corrosive compounds elementary sulphur is the most important. Another type is denominated "sour bodies", i. e., those which are removable by the treatment with alkali plumbite, these bodies being hydrogen sulphide and mercaptans.

Several methods are known for the removal of sour bodies, but the removal of the corrosive sulphur is one of the great problems of the petroleum industry. Heavy treatment of the gasolines with expensive chemicals entailing a high loss of gasoline fractions are necessary to remove the sulphur. Sulphuric acid is the most common treating agent for reducing total sulphur and bringing the oil to the proper color but it frequently leaves the oil still corrosive due to its inability to remove elementary sulphur.

We have discovered that sulphur can be removed with substantially no loss of gasoline fractions by treating the gasoline with an alcoholic solution of alkali metal hydroxide, such as potassium, sodium, caesium and rubidium hydroxides, of which the most advantageous is alcoholic potassium hydroxide. This alcoholic potash is more than ten times as effective as alcoholic sodium hydroxide; that is, it requires more than ten times as much reagent in the latter case. While the reaction is obscure, it is believed that the effect is to convert the potassium hydroxide into potassium sulphide, poly-sulphides, thio-sulphates and potassium sulphite. These products can be washed out along with the excess alcoholic soda or potash.

As an example of the effectiveness of this treatment, 100 ml. of cleaner's solvent, which is a fraction of gasoline, was treated with 10 ml. of alcoholic potash containing 30% of KOH. All of the elementary sulphur was removed. This sample contained 4/10 grams of dissolved elementary sulphur.

The concentration of KOH found most desirable is a 30% solution. The efficiency of the removal of sulphur by alcoholic potash is found to be greatly affected by the presence of water. While the sulphur removal can be effected by alcoholic potash containing various quantities of water, considerably more of the reagent is necessary as the water content increases. Thus for instance when the water content is greater than 2%, the cost of the reagent required is beyond the economic limit as compared with the use of other reagents for the removal of sulphur. Absolute ethyl alcohol is, therefore, the most efficient. It is best to dry the oil if it is wet before treating with the alcoholic potash. Calcium chloride, flake alkali, adsorbent clay and other known dehydrating agents may be employed for this dehydration. The reaction involved is also sensitive to oxygen and should be carried out with exclusion of air. Air agitation should be avoided therefore.

Other common solvents for the alkili metal hydroxides, particularly potash hydroxide, and the oil may be employed instead of absolute alcohol; thus for instance, acetone can be used in the place of alcohol. Also, there may be used, besides ethyl alcohol, other alcohols such as methyl, propyl, and butyl alcohols, ketones such as acetone, methl ethyl ketone, and higher ketones, and amino alcohols such as ethanolamine. While KOH is not soluble in benzol or toluol, they may be added to alcohol as a denaturant without impairing the value of the alcohol. The fact that these alcohols and ketones may be employed makes possible the use of denatured alcohol; thus 95% of absolute ethyl alcohol plus 5% of methyl alcohol or 5% benzol is as effective as pure absolute ethyl alcohol.

It is advisable to neutralize the acidity of the gasoline before treatment with the alcoholic potash in order to avoid using up of the expensive alcoholic potash. The corrosive light oil, such as gasoline or cleaners' naphtha, which has been treated for color and sourness in the conventional manner is treated with 3% by volume of a solution of 20% (26° Baumé) caustic alkali and the mixture is allowed to settle for one hour. The caustic alkali is drawn off. The oil is then dried with about two pounds per barrel of adsorbent clay. The clay is removed. The oil is then treated with from 0.1 to 0.2% by volume of a solution of KOH containing 2.35 pounds of KOH per gallon of alcohol. The alcoholic potash is agitated with the oil mechanically, preferably with exclusion of air in closed agitators. When a uniform mixture has been obtained the mixture is allowed to stand for about 30 minutes, and the oil is then washed with water to remove the alcohol, KOH and the reaction products. The oil is then treated with 93% acid and finally with 20% caustic solution to neutralize the acid.

The above description is not to be taken as limiting but merely illustrative of the invention. Many modifications will appear to those skilled in the art and will be embraced in our invention which we claim to be:

1. A method of treating oil containing elementary sulphur which includes the following steps in the following order, treating said oil with water solution of caustic alkali, separating the alkali from the oil, dehydrating the oil with adsorbent clay, separating the clay from the oil, treating the oil with an alcoholic solution of potassium hydroxide and separating treated oil free of elementary sulphur from unconsumed reagent.

2. A method of treating oil containing elementary sulphur which includes the following steps in the following order, treating said oil with a water solution of caustic alkali, removing alkali from the oil, dehydrating the oil with adsorbent clay, separating said clay from the oil, treating the oil with an alcoholic solution of potassium hydroxide, treating the oil with sulphuric acid to neutralize potassium hydroxide contained in the treated oil and treating the oil with caustic alkali to neutralize said acid treated oil.

JOHN PERL.
REINHARDT SCHUHMANN.

CERTIFICATE OF CORRECTION.

Patent No. 1,935,725.                                              November 21, 1933.

JOHN PERL, ET AL.

It is hereby certified that error appears in the printed specification of the above numbered patent requiring correction as follows: Page 2, line 5, claim 1, strike out the word "water"; and line 78, claim 2, strike out the words "in the following order, treating said oil with a"; and that the said Letters Patent should be read with these corrections therein that the same may conform to the record of the case in the Patent Office.

Signed and sealed this 19th day of June, A. D. 1934.

Bryan M. Battey (Seal)                                                     Acting Commissioner of Patents.